(12) United States Patent
Wagh et al.

(10) Patent No.: US 9,618,084 B2
(45) Date of Patent: Apr. 11, 2017

(54) COMPACT PLANETARY ARRANGEMENT FOR FINAL DRIVE

(71) Applicant: Deere & Company, Moline, IL (US)

(72) Inventors: Rahul Wagh, Pune (IN); Jeffrey S. Turner, Coffeyville, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/835,496

(22) Filed: Aug. 25, 2015

(65) Prior Publication Data

US 2017/0059003 A1  Mar. 2, 2017

(51) Int. Cl.
  *F16H 48/06* (2006.01)
  *F16H 1/46* (2006.01)

(52) U.S. Cl.
  CPC ...................................... *F16H 1/46* (2013.01)

(58) Field of Classification Search
  None
  See application file for complete search history.

(56) References Cited

U.S. PATENT DOCUMENTS

| | | |
|---|---|---|
| 2,919,778 A | 1/1960 | Aschauer |
| 3,115,204 A | 12/1963 | Dence |
| 3,458,005 A | 7/1969 | Malm et al. |
| 4,330,045 A | 5/1982 | Myers |
| 4,856,377 A | 8/1989 | Goudreau et al. |
| 4,920,828 A | 5/1990 | Kameda et al. |
| 5,006,100 A | 4/1991 | Brandt et al. |
| 5,478,290 A | 12/1995 | Buuck et al. |
| 5,489,013 A | 2/1996 | Buuck et al. |
| 5,538,121 A | 7/1996 | Hering |
| 6,590,306 B2 | 7/2003 | Terada |
| 6,852,061 B2 | 2/2005 | Schoon |
| 7,182,708 B2 | 2/2007 | Winzeler |
| 7,445,108 B2 | 11/2008 | Bauer et al. |
| 7,604,561 B2 | 10/2009 | Earhart |
| 8,133,143 B2 | 3/2012 | Schoon |
| 8,323,143 B2 | 12/2012 | Schoon |
| 8,413,779 B2 | 4/2013 | Fronius et al. |
| 8,449,424 B2 | 5/2013 | Schoon |
| 8,616,087 B2 | 12/2013 | Sayama |

(Continued)

OTHER PUBLICATIONS fsae.com, Bearing Selection and Loads, Online Forum Open Discussion, http://www.fsae.com/forums/showthread.php?11598-Bearing-Selection-and-Loads, Jan. 22, 2014.

*Primary Examiner* — Dirk Wright
(74) *Attorney, Agent, or Firm* — Lorenz & Kopf, LLP (57) ABSTRACT

A drive assembly, receiving rotational power from an input shaft rotatable about a rotation axis, includes a drive housing and first and second stage planetary gear sets. The first stage planetary gear set includes a first stage sun gear that may be coupled to the input shaft to turn a plurality of first stage planet gears rotatably mounted to a first stage planet carrier that turns with respect to a first stage ring gear, which is fixed with respect to the drive housing. The second stage planetary gear set includes a second stage sun gear turned by the first stage planet carrier to turn a plurality of second stage planet gears rotatably mounted to a second stage planet carrier, which is fixed with respect to the drive housing and about which turns a second stage ring gear. An output hub is rotated about the rotation axis with respect to the drive housing by rotation of the second stage ring gear on the second stage planet carrier.

20 Claims, 8 Drawing Sheets

(56) References Cited

U.S. PATENT DOCUMENTS

| | | |
|---|---|---|
| 8,727,933 B2 | 5/2014 | Enderle et al. |
| 8,746,385 B2 | 6/2014 | Wargh et al. |
| 8,758,181 B2 | 6/2014 | Calvert |
| 8,790,209 B2 | 7/2014 | Demick et al. |
| 2014/0139009 A1 | 5/2014 | Bindl et al. |

COMPACT PLANETARY ARRANGEMENT FOR FINAL DRIVE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive arrangements, and in particular to final drives for work vehicles having planetary gear sets.

BACKGROUND OF THE DISCLOSURE

In various applications, a drive assembly may be utilized to provide rotational power to various components. In various wheeled or tracked vehicles, for example, a final drive assembly may be mounted to a frame of the vehicle to provide rotational power, at an output hub of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the output hub. In some cases, the motors may be operated at one or more different speeds. The drive assemblies may also include a park brake arrangement, such as a spring applied, hydraulically released brake, to brake the drive motor. Arranging and packaging complex assemblies such as these, along with gear trains, bearings, shafts and other drive components, in what may be a relatively tight space envelop may be a challenge, particularly when high gear reduction and torque are required.

SUMMARY OF THE DISCLOSURE

The disclosure provides a drive with a two-stage planetary gear arrangement that may provide high gear reduction and high torque in a compact form factor.

In one aspect the disclosure provides a drive assembly, receiving rotational power from an input shaft rotatable about a rotation axis, including a drive housing and first and second stage planetary gear sets. The first stage planetary gear set includes a first stage sun gear configured to couple to the input shaft to turn a plurality of first stage planet gears rotatably mounted to a first stage planet carrier that turns with respect to a first stage ring gear, which is fixed with respect to the drive housing. The second stage planetary gear set includes a second stage sun gear turned by the first stage planet carrier to turn a plurality of second stage planet gears rotatably mounted to a second stage planet carrier, which is fixed with respect to the drive housing and about which turns a second stage ring gear. An output hub is rotated about the rotation axis with respect to the drive housing by rotation of the second stage ring gear on the second stage planet carrier.

In another aspect the disclosure provides a drive assembly, receiving rotational power from an input shaft rotatable about a rotation axis, with a drive housing defining a first annular cavity and a second annular cavity as a unitary part of the drive housing. A first stage planetary gear set is contained in the drive housing and includes a first stage sun gear coupled to the input shaft to turn a plurality of first stage planet gears rotatably mounted to a first stage planet carrier that turns with respect to a first stage ring gear fixed with respect to the drive housing at the first annular cavity. A second stage planetary gear set is contained in the drive housing and includes a second stage sun gear turned by the first stage planet carrier to turn a plurality of second stage planet gears rotatably mounted to the second stage planet carrier fixed with respect to the drive housing at the second annular cavity about which turns a second stage ring gear. An output hub is rotated about the rotation axis with respect to the drive housing by rotation of the second stage ring gear on the second stage planet carrier.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive assembly, as shown in the accompanying figures of the drawings described briefly above. Various modifications to the example embodiments may be contemplated by one of skill in the art.

Known designs for drive assemblies may be unsatisfactory in a number of respects. For example, such drives may exhibit significant complexity, leading to high manufacturing costs and a significant increase in size and weight. This is particularly the case in off-highway and other such vehicles in which it is desirable for the drive to provide a large gear reduction and high torque, such as by using a multi-stage planetary gear set arrangement, while at the same time reducing the space envelope required for the drive. In the case of certain in-line drive arrangements, such as final drives, a key envelope dimension is the axial dimension about which certain drive components rotate to drive the wheels or other vehicle components.

In this regard, the term "axial" as used herein refers to a direction that is generally parallel to an axis of rotation, axis of symmetry, or centerline of a component or components.

For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric).

Certain known drive assemblies may include a motor mounted at an end of a gear housing of the drive assembly. The gear housing may be integrally formed with a hub, which may be attached to an external device, such as a wheel or sprocket, in order to provide rotational power from the motor to the external device. A planetary (or "epicyclic") gear set in communication with the motor may be disposed within the gear housing in order to provide a speed reduction of various ratios with respect to the rotational power from the motor. The planetary gear set may incorporate multiple "stages" (e.g., a first and a second stages), such that communication between the stages as well as, in some cases, the gear housing, provides the desired gear reduction and torque.

The assembly of multi-stage planetary gear sets of this type, which often include a large number of moving parts, tends to be complex and costly. Furthermore, the axial dimension of such gear sets can be larger than desired for certain applications. For example, in some final drive designs the ring gear of the first stage of the gear set is used as a rotating member (i.e., not fixed) and/or the planetary gear is compounded in a complex manner. As a result, in such designs it is difficult to achieve deep gear reduction in the first stage planetary set without greatly increasing the axial dimension and/or reducing the power transfer efficiency of the gear set. Indeed, the complexity of the planetary gear set itself often defines the axial size of the drive assembly.

The disclosed drive assembly may address various of the issues noted above, as well as provide various additional benefits. Generally, in place of the relatively complex multi-stage planetary gear sets of known arrangements (e.g., those incorporating a rotating first stage ring gear member and/or compound planetary gears), the disclosed drive assembly has a planetary set with a fixed ring gear and output hub arrangement to provide deep gear reduction, high torque in a compact form factor. Further enhancements to the gear reduction and power transfer efficiency are achieved by avoiding the use of compound gears.

In certain embodiments, the disclosed drive assembly may include a stationary drive housing (e.g., a single-piece housing) that functions as both a second stage carrier housing and a fixed ring gear, or fixed ring gear mount, for the first stage planetary set. In addition, the drive assembly may provide other advantages by utilizing the stationary drive housing for other functions. For example, the drive housing may provide a wheel bearing support, a mounting support for a motor, and a housing for a parking brake. Such a design drastically reduces the part-count of the drive assembly and may also exhibit a higher reduction ratio, a greater power transfer efficiency, and a reduced size, particularly in the axial direction. In some embodiments, for example, the axial dimension of the drive assembly may be reduced by approximately 30%-40% relative to known drive assemblies with similar, or even lesser, performance characteristics.

Figure 1:
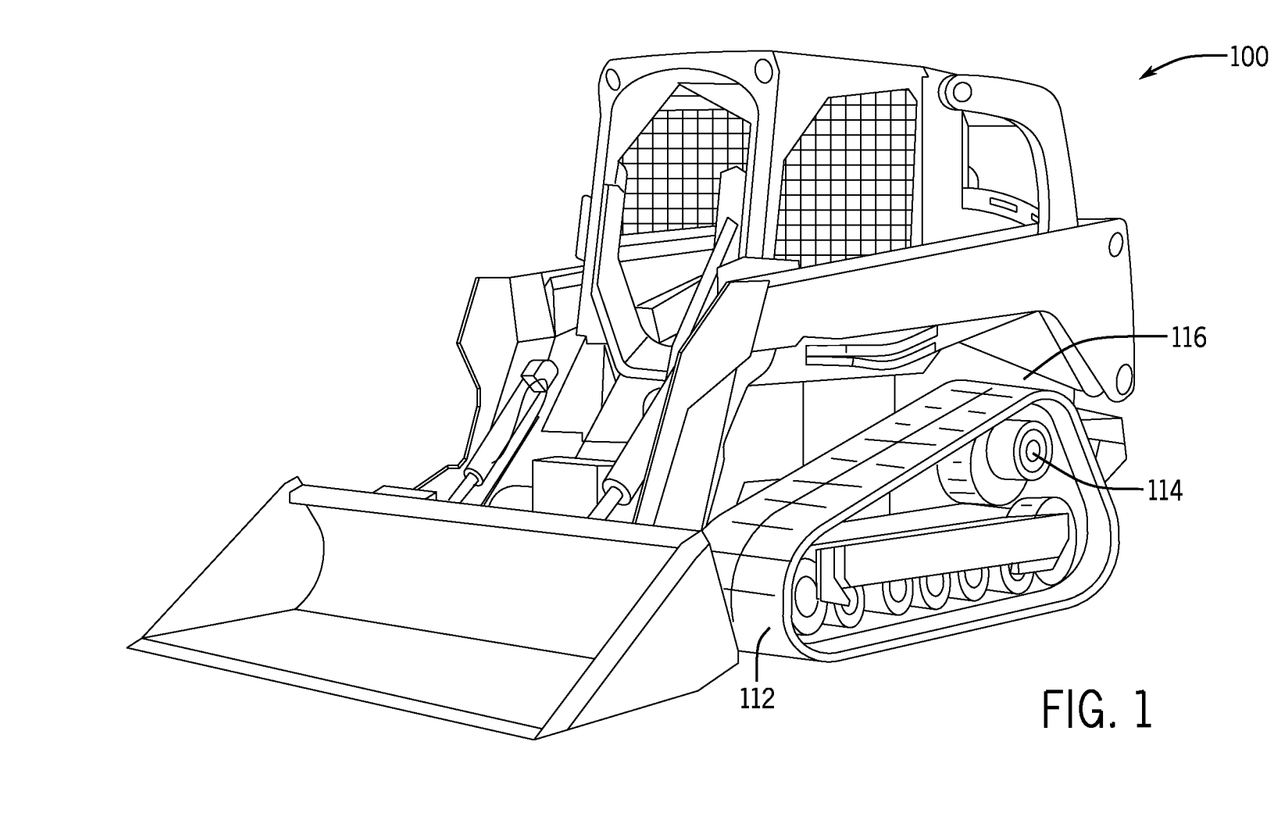
FIG. 1 is a perspective view of an example vehicle in which a drive assembly according to the present disclosure may be implemented.

Referring now to the drawings, the disclosed drive assembly may be utilized in the context of a wide range of vehicles, including, for example, an off-road work vehicle in the form of a compact track loader ("CTL") 100. The example CTL 100 has ground-engaging tracks 112, and an example drive assembly 114 configured as a final drive assembly that is mounted to a frame 116 of the CTL 100 in order to provide motive power to the tracks 112. It will be understood that the depicted the CTL 100 is presented merely as an example, and that the disclosed drive assembly (e.g., drive assembly 114) may be utilized with other vehicles or machines. Further, it will be understood that the disclosed drive assembly 114 may be utilized as a final drive assembly, as illustrated for providing motive power to a ground-engaging element of the CTL 100 (e.g., wheels, tracks 112, or the like), or may be utilized to provide rotational power to other types of devices.

Figure 2:
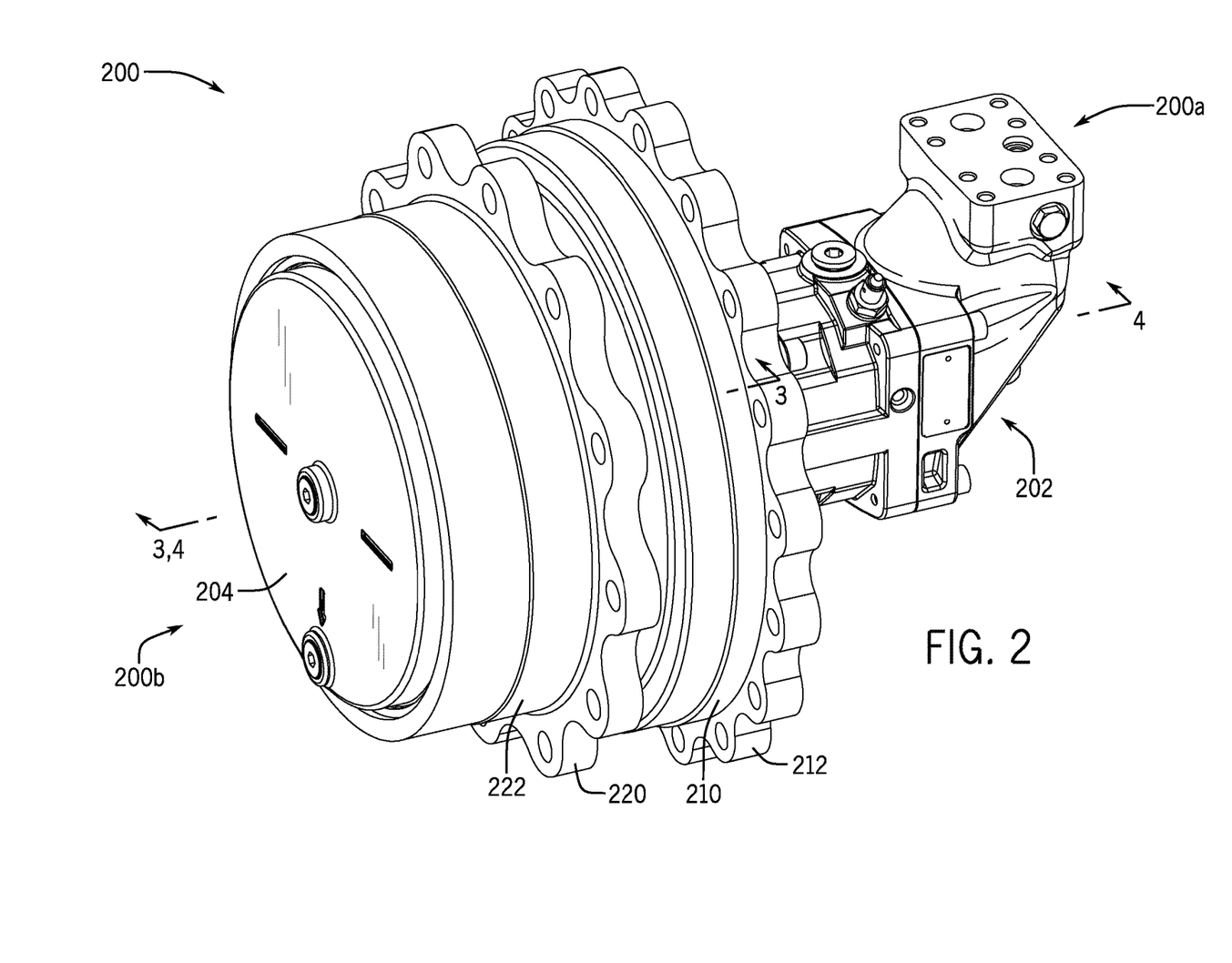
FIG. 2 is a perspective, exterior overview of an example drive assembly according to the present disclosure.

FIG. 2 illustrates the exterior of an example drive assembly 200 that may be used as an implementation of the drive assembly 114 of FIG. 1. As depicted, the drive assembly 200 generally includes a mounting hub 212 with bolt holes along its periphery for attachment to the frame 116 of the CTL 100. As such, the drive assembly 200 may be utilized as a final drive assembly for driving the tracks 112 of the CTL 100. The mounting hub 212 may be included as a part of a larger drive housing (or simply "housing") 210 of drive assembly 200, and is configured to remain relatively stationary during operation of drive assembly 200, as will described in further detail below. A drive motor 202 may be attached to the drive housing 210 (e.g., via a motor mount, not illustrated in FIG. 2) at an axial end 200a of the drive assembly 200, such that the drive motor 202 may be held in an appropriately stationary orientation for delivery of rotational power to the drive assembly 200. The drive motor 202 may be implemented as a hydrostatic motor and a drive input shaft (not shown in FIG. 1) extending towards another axial end 200b of the drive assembly 200. In other embodiments, alternate configurations are possible. For example, in certain embodiments, the drive motor 202 may be implemented as electric motor or by other power sources, such as an external power source (e.g., an engine).

The drive assembly 200 may further include an output hub 220 having an annular mounting surface 222, which extends from output hub 220 towards axial end 200b of the drive assembly 200. The output hub 220 may be configured to directly engage the tracks 112 of the CTL 100, or may mount an intermediate power transmission component, such as a drive sprocket (not shown), which engages the tracks 112. In any case, rotation of the output hub 220 may drive movement of the tracks 112, and thereby movement of the CTL 100. The drive assembly 200 may further include an end cap 204 near axial end 200b of drive housing 210. In other embodiments, other output interfaces may be utilized to engage with tracks 112 or other external devices.

Figure 3:
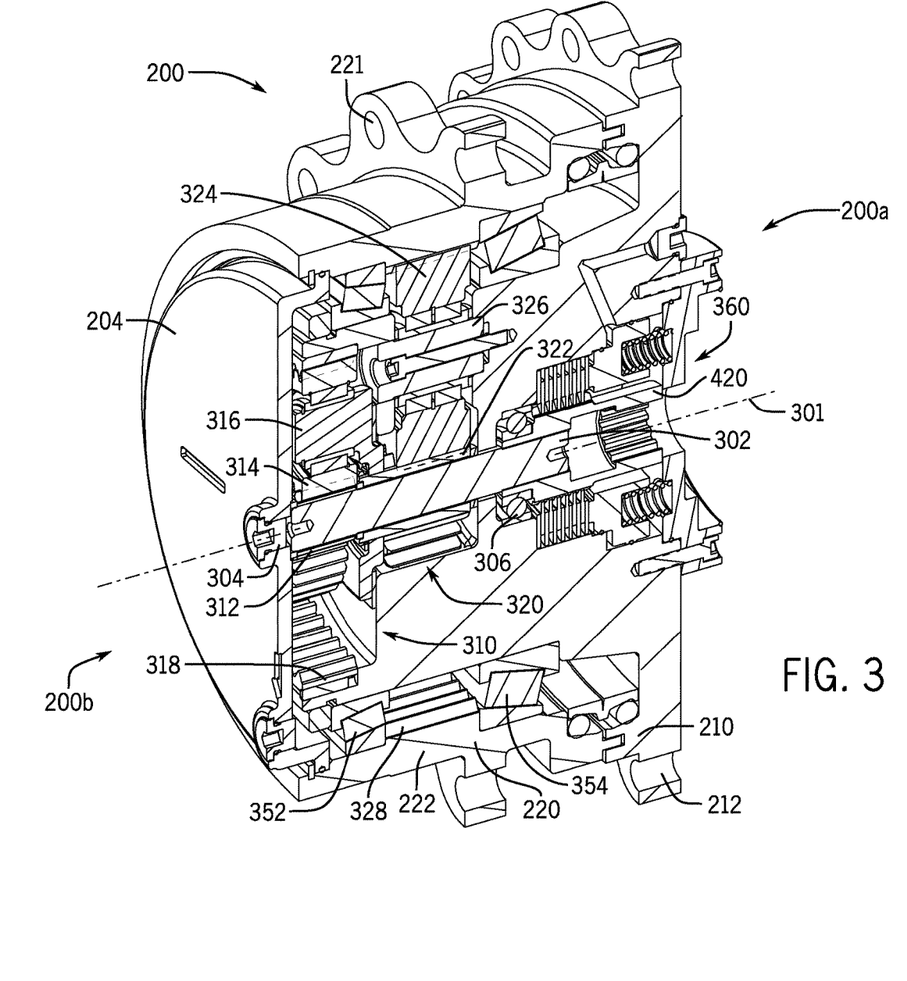
FIG. 3 is a perspective, sectional view of the example drive assembly of FIG. 2.
Figure 4:
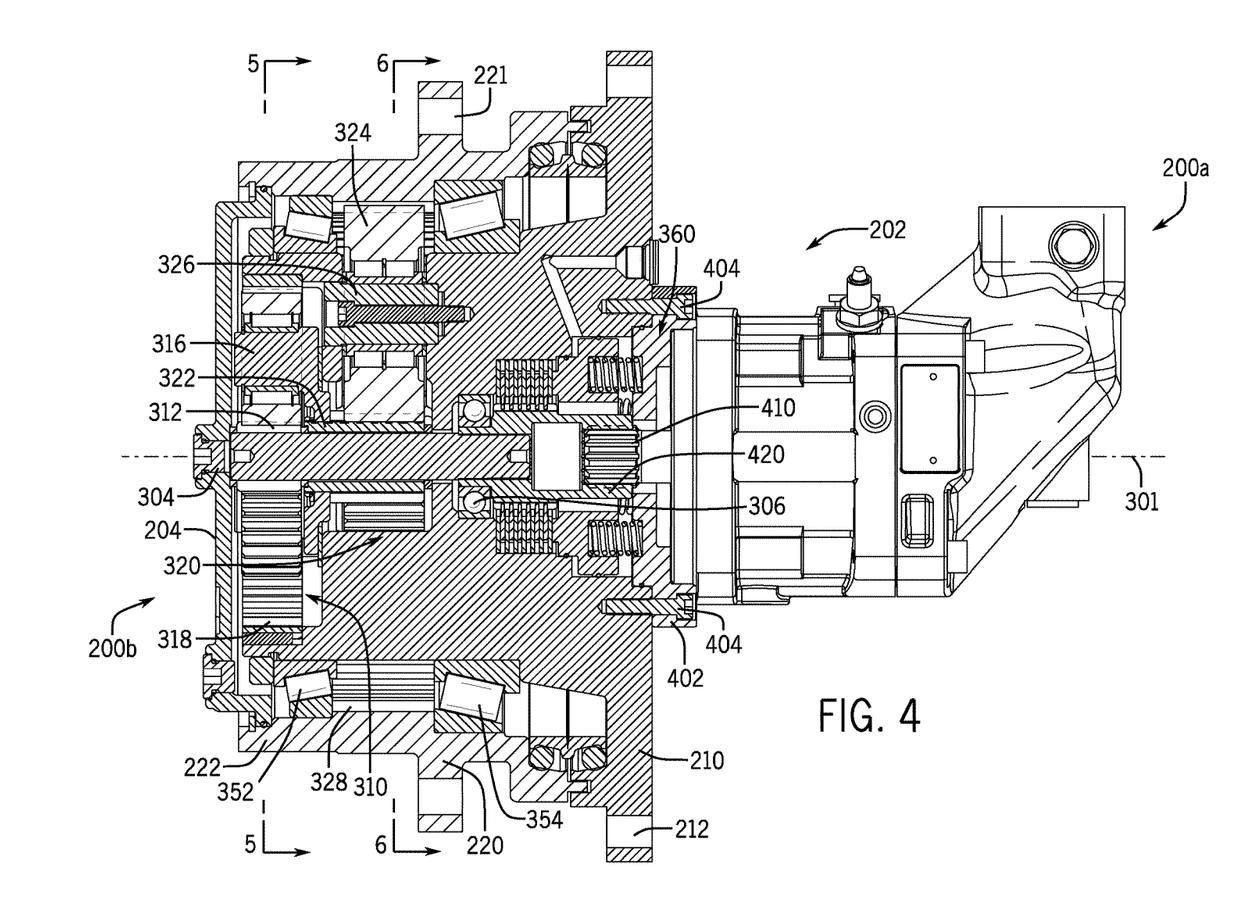
FIG. 4 is a side sectional view of the example drive assembly of FIG. 2.

Referring now also to FIGS. 3 and 4, perspective and side sectional views of the example drive assembly 200 are shown without the drive motor 202 shown in FIG. 2. As a preliminary matter, it will be appreciated that various components (or assemblies) of the drive assembly 200 may generally exhibit radial symmetry, such that for these components the views depicted in FIGS. 3 and 4 may represent a view of any number of diametric planes through the drive assembly 200. The drive assembly 200 includes a sun shaft 302 mounted (e.g., via associated bearings 304 and 306) within the drive housing 210 and being driven by the motor 102 for rotation about a rotation axis 301, as described below. The drive assembly 200 further includes an example double planetary gear set having a first stage planetary gear set 310 and a second stage planetary gear set 320 contained within drive housing 210.

Figure 5:
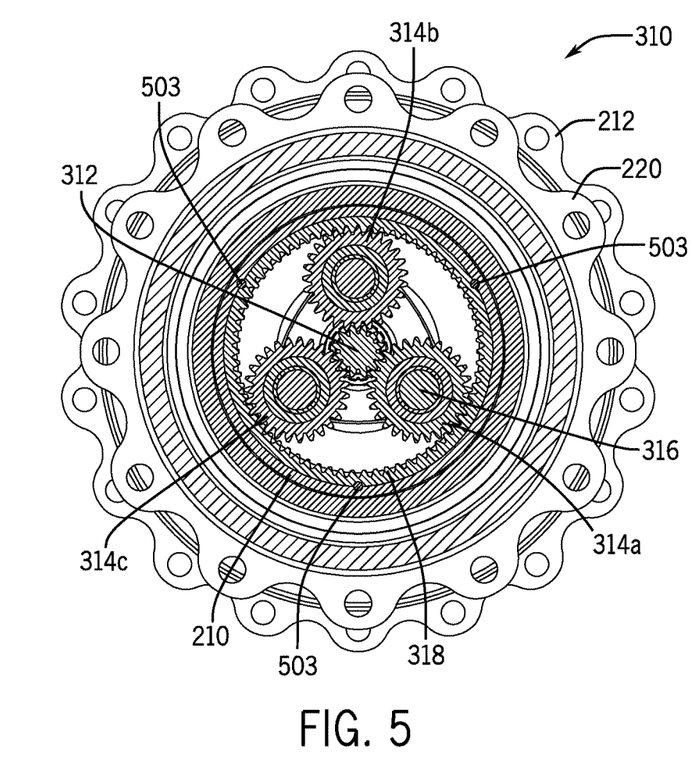
FIG. 5 is a sectional view of the first stage planetary gear set of the example drive assembly of FIG. 4.
Figure 6:
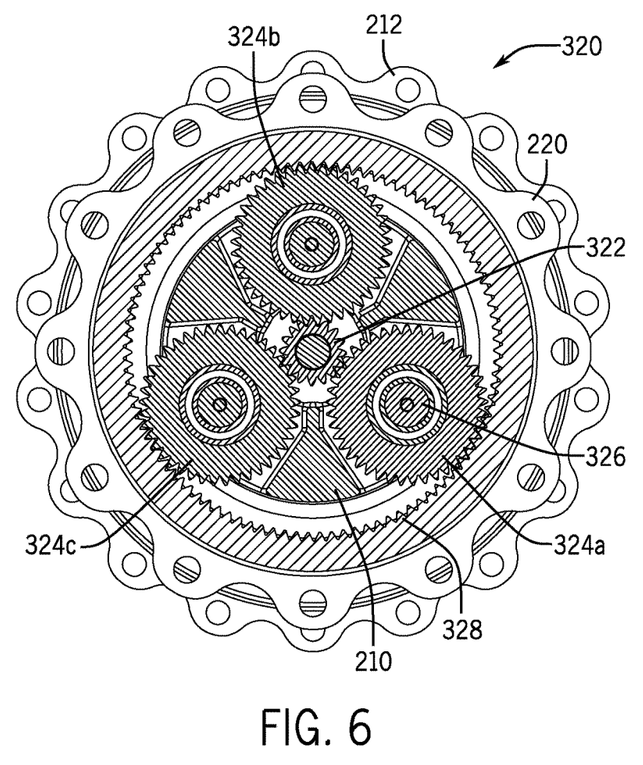
FIG. 6 is a sectional view of the second stage planetary gear set of the example drive assembly depicted in FIG. 4.

More particularly, the first stage planetary gear set 310 may include a first stage sun gear 312 that is coupled to, or formed on the end of, the sun shaft 302 to turn a plurality of first stage planet gears 314. The planet gears 314 are rotatably mounted (e.g., via pinon shafts) to a first stage planet carrier 316 that turns with respect to a first stage ring gear 318, which is fixed with respect to the drive housing 210. The planet gears 314 are meshed with the sun gear 312 and with the ring gear 318, as shown in FIGS. 4 & 5. Similarly, the second stage planetary gear set 320 includes a second stage sun gear 322 turned by the first stage planet carrier 316. The planet carrier 316 turns a plurality of second stage planet gears 324 rotatably mounted to a second stage planet carrier 326 (e.g., via pinion shafts), which is fixed with respect to the drive housing 210 and about which turns a second stage ring gear 328. The planet gears 324 are meshed with a sun gear 322 and a ring gear 328, as shown in FIGS. 4 and 6. Accordingly, the output hub 220 thus rotates (e.g., via bearings 352 and 354) about the rotation axis 301 with respect to the drive housing 210 by rotation of the second stage ring gear 328 on the second stage planet carrier 326.

Referring now also to FIG. 5, the first stage planetary gear set 310 may have the sun gear 312 meshing with planetary gears 314a, 314b, and 314c. The planetary gears 314a, 314b, and 314c, which are supported by the carrier 316, in turn mesh with the ring gear 318. As mentioned above, the ring gear 318 is fixed with respect to the drive housing 210. In this regard, and as described in further detail below, the ring gear 318 may be formed as a unitary part of drive housing 210 (e.g., as part of an annular cavity of drive housing 210 that is concentric about rotation axis 301). Alternatively, the ring gear 318 may be a separate component from the drive housing 210 and may be fixedly mounted to the drive housing 210 through a suitable attachment method, also described below.

Referring also to FIG. 6, the second stage planetary gear set 320 may have the sun gear 322 meshing with planetary gears 324a, 324b, and 324c. The planetary gears 324a, 324b, and 324c are held by the planet carrier 326, and mesh with the ring gear 318. The planet carrier 326 is fixed with respect to the drive housing 210. As described in further detail below, the planet carrier 326 may be formed as a unitary part of the drive housing 210 (e.g., a second annular cavity that is concentric about rotation axis 301). The second stage ring gear 318 may be formed as a separate component or may be formed as a unitary part of the output hub 220. In one embodiment, for example, second stage ring gear 318 is formed as a separate component and is fixedly mounted to a ring gear mount at an inner annular surface of the output hub 220. It will be understood that while each of the illustrated gear sets are shown as including three planetary gears, the disclosed embodiments are not so limited, and may include any number of planet gears.

In accordance with one embodiment, the drive housing 210 includes the annular mounting surface 222 at which a drive sprocket (not shown) or other drive component may connect for co-rotation with the output hub 220 of the drive assembly 200. The mounting surface 222 may provide a plane of rotation about which the drive sprocket or other drive component is mounted symmetrically or approximately symmetrically, with respect to the bearings 352 and 354. The drive sprocket or other drive component may be secured to the output hub 220 by bolting to sprocket flange 221 such that drive sprocket is centered on the plane of rotation. In this way, the load from the drive sprocket or other drive component is effectively evenly spilt, or shared by, the bearings 352 and 354, which reduces premature wear and enhances bearing life.

Figure 7:
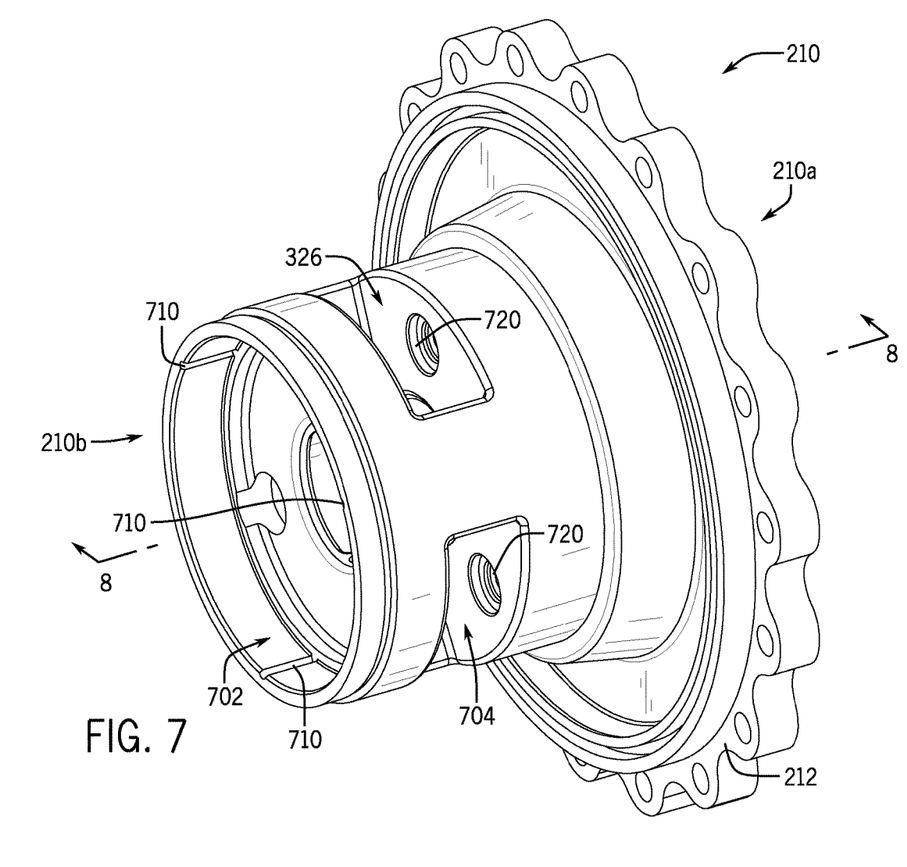
FIG. 7 is a perspective view of the drive housing of the example drive assembly depicted in FIG. 3.

FIG. 7 shows a perspective view of the drive housing 210 of the example drive assembly depicted in FIG. 3. As illustrated, the drive housing 210 may be a unitary member extending from one axial end 210a to another axial end 210b. The drive housing 210 may be formed using a variety of materials and methods. Suitable materials include, for example, cast iron, steel alloys, and/or other materials capable of withstanding the stresses experienced during operation.

The drive housing 210 may thus provide a rigid support for fixing the angular position of first stage ring gear 318 and the second stage planet carrier 326 (see FIG. 3). The drive housing 210 may include two generally annular cavities 702 and 704, as shown. The annular cavity 704 is configured such that the second stage planet carrier 328 may be formed as a unitary part of the drive housing 210 concentric about the rotation axis 301. Each planet gear may be rotatably mounted to the drive housing 210 via pinions or the like that may have their ends mounted within corresponding openings 720.

Figure 9:
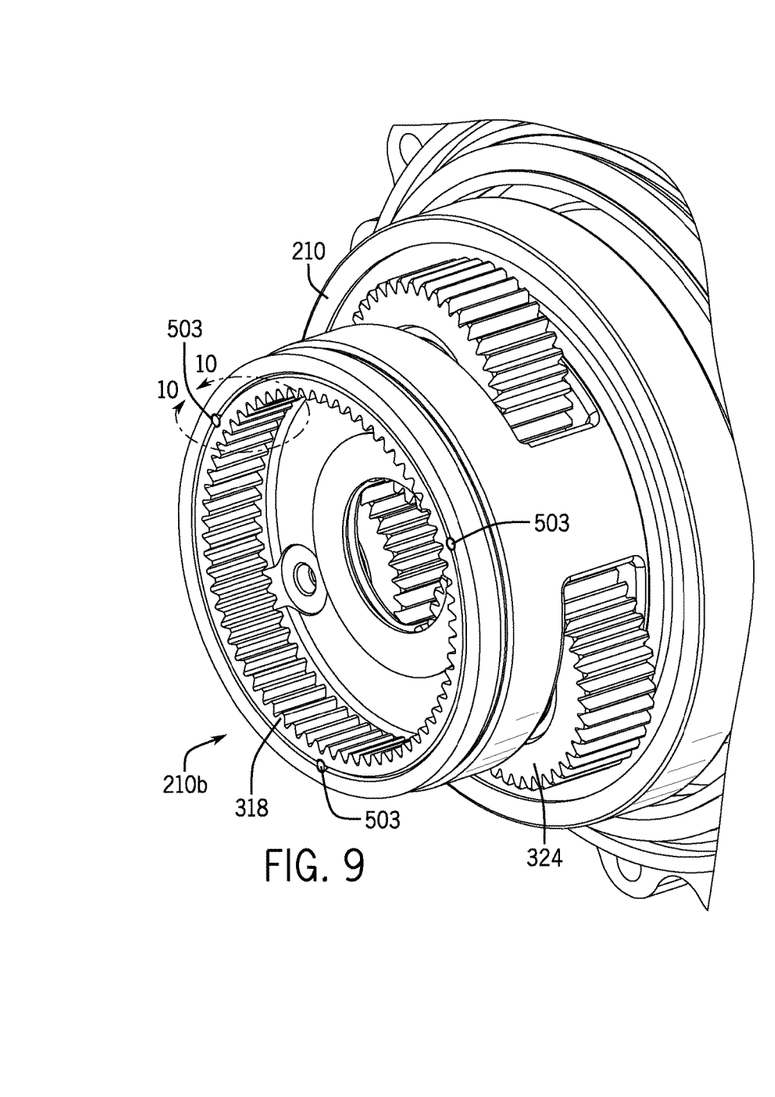
FIG. 9 is a perspective view of various planetary gear set components within the drive housing depicted in FIG. 3.
Figure 10:
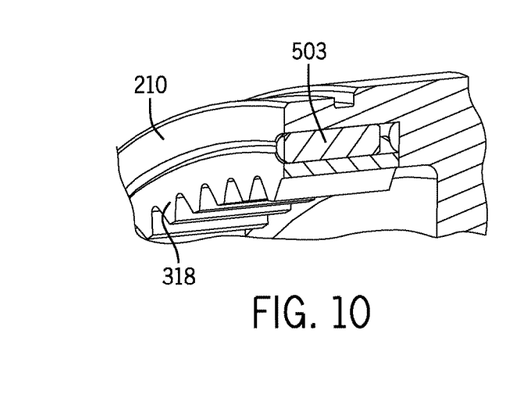
FIG. 10 is a close-up sectional view of a portion of the first stage ring gear and drive housing depicted in FIG. 9.

The annular cavity 702 is configured such that ring gear 318 (FIG. 3) may be fixedly mounted to or formed as a unitary part of annular cavity 702 concentric about the rotation axis (see FIG. 9). The annular cavity 702 may include one or more recesses 710 defining (in conjunction with corresponding recesses in ring gear 318) one or more pockets for receiving one or more rotation fixing pins, such as rotation fixing pins 503 that fit within one or more "pockets" defined by corresponding recesses in the ring gear 318 and the drive housing 210. FIG. 10 is a close-up sectional view of a portion of the first stage ring gear 318, drive housing 210, and one rotation fixing pin 503. It can be seen that associated recesses in the ring gear 318 and the drive housing 210, when they are lined up rotationally, form a pocket to receive the corresponding rotation fixing pin 503. It will be appreciated that while the illustrated embodiment shows generally cylindrical pockets and fixing pins, the range of possible embodiments is not so limited.

Figure 8:
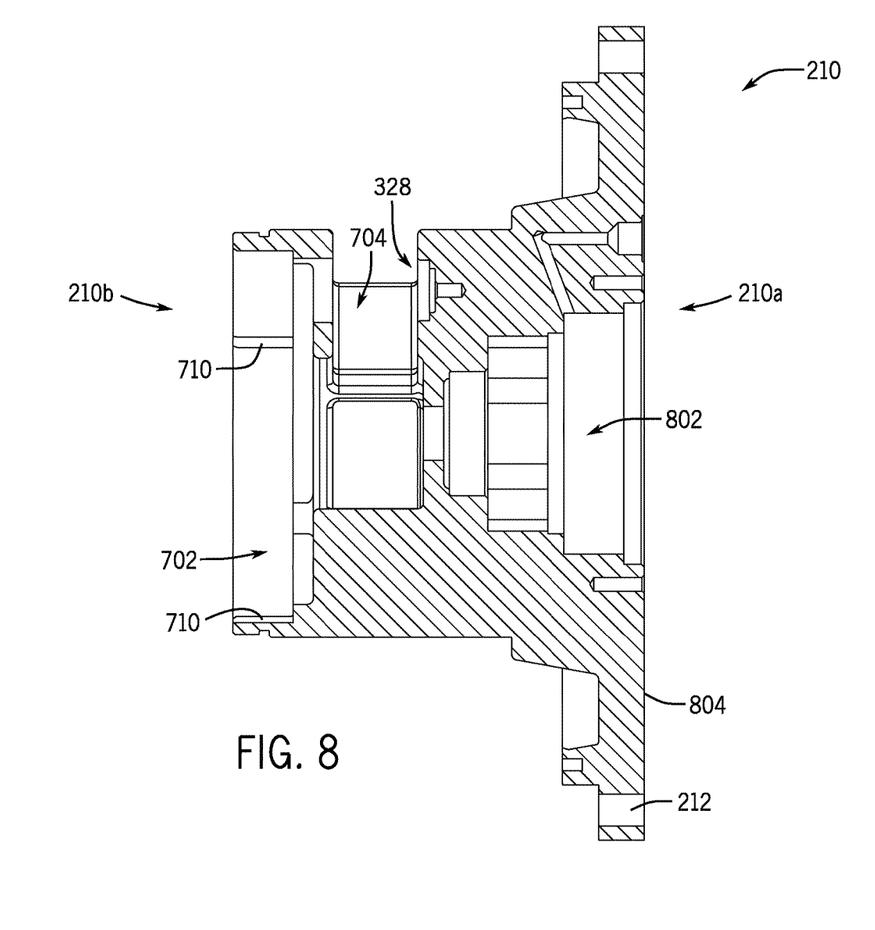
FIG. 8 is a side sectional view of the drive housing of FIG. 7.

As shown in FIG. 4, the drive motor 202 interfaces with the drive housing 210 via a motor mount 402, and is secured toward the axial end 200a of the drive housing 210 with bolts 404 or other suitable attachment components. The drive motor 202 is seated such that external splines on its drive input shaft 410 mate with internal splines of a coupler 420, which connect the sun shaft 302 for co-rotation, as shown. Also illustrated in cross-section is parking brake 360, which is coupled to the sun shaft 302 and fits within a corresponding brake cavity of the drive housing 210. As shown in FIG. 8, the drive housing 210 may define a brake cavity 802 concentric about the rotation axis 301 and opening at a rear side 804 of the drive housing 210 opposite the second stage planet carrier (e.g., unitary with annular cavity 704). The brake cavity 802 is configured to accept a parking brake assembly (e.g., spring applied hydraulically released parking brake assembly 360 shown in FIGS. 3 and 4). It will be appreciated that the particular shape of brake cavity 802 shown in FIG. 8 is not meant to be limiting, and that brake cavity 802 may be formed to accommodate a a variety of parking brake assemblies.

The above describes one or more example embodiments of a compact drive assembly that may provide deep gear reduction ratios and high torque. In one non-limiting example, the above-described construction is suitable to provide a drive assembly with a gear reduction ratio of about 40:1 and output torque of about 10,000 Nm. This functionality can be achieved in an assembly having small form-factor, such as in which the output hub dimension is about 115 mm in diameter and 300 mm in the axial dimension.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drive assembly receiving rotational power from an input shaft rotatable about a rotation axis, the drive assembly comprising:
   a drive housing;
   a first stage planetary gear set contained in the drive housing, the first stage planetary gear set including a first stage sun gear configured to couple to the input shaft to turn a plurality of first stage planet gears rotatably mounted to a first stage planet carrier that turns with respect to a first stage ring gear that is fixed with respect to the drive housing;
   a second stage planetary gear set contained in the drive housing, the second stage planetary gear set including a second stage sun gear turned by the first stage planet carrier to turn a plurality of second stage planet gears rotatably mounted to a second stage planet carrier that is fixed with respect to the drive housing and about which turns a second stage ring gear; and
   an output hub rotated about the rotation axis with respect to the drive housing by rotation of the second stage ring gear on the second stage planet carrier;
   wherein the drive housing has an annular outer surface that provides a bearing mount for a bearing mounting the output hub for rotation with respect to the drive assembly;
   wherein the bearing mount provides a plane of rotation about which the bearing is mounted symmetrically; and
   wherein the output hub includes a sprocket flange for mounting an output sprocket, the output sprocket being centered on the plane of rotation.

2. The drive assembly of claim 1, wherein the drive housing is a unitary member providing a rigid support for fixing the angular position of the first stage ring gear and the second stage planet carrier.

3. The drive assembly of claim 2, wherein the first stage ring gear is formed as a unitary part of an annular cavity of the drive housing concentric about the rotation axis.

4. The drive assembly of claim 2, wherein the first stage ring gear is a separate component from the drive housing fixedly mounted to an annular cavity of the drive housing.

5. The drive assembly of claim 4, wherein the annular cavity of the drive housing and the first stage ring gear have complementary recesses defining at least one pocket for receiving at least one rotation fixing pin.

6. The drive assembly of claim 2, wherein the second stage planet carrier is formed as a unitary part of a second annular cavity of the drive housing concentric about the rotation axis.

7. A drive assembly receiving rotational power from an input shaft rotatable about a rotation axis, the drive assembly comprising:
   a drive housing;
   a first stage planetary gear set contained in the drive housing, the first stage planetary gear set including a first stage sun gear configured to couple to the input shaft to turn a plurality of first stage planet gears rotatably mounted to a first stage planet carrier that turns with respect to a first stage ring gear that is fixed with respect to the drive housing;
   a second stage planetary gear set contained in the drive housing, the second stage planetary gear set including a second stage sun gear turned by the first stage planet carrier to turn a plurality of second stage planet gears rotatably mounted to a second stage planet carrier that is fixed with respect to the drive housing and about which turns a second stage ring gear;
   an output hub rotated about the rotation axis with respect to the drive housing by rotation of the second stage ring gear on the second stage planet carrier; and
   a brake assembly configured to couple to the input shaft;
   wherein the drive housing defines a brake cavity concentric about the rotation axis and opening at a rear side of the drive housing opposite the second stage planet carrier.

8. The drive assembly of claim 7, wherein the drive housing has an annular outer surface that provides a bearing mount for a bearing mounting the output hub for rotation with respect to the drive assembly.

9. The drive assembly of claim 8, wherein the bearing mount provides a plane of rotation about which the bearing is mounted symmetrically; and
   wherein the output hub includes a sprocket flange for mounting an output sprocket, the output sprocket being centered on the plane of rotation.

10. The drive assembly of claim 1, further including:
    a motor mount coupled to the drive housing; and
    a drive motor mounted to the drive housing by the motor mount to drive the input shaft to rotate about the rotation axis.

11. The drive assembly of claim 1, wherein the second stage ring gear is formed as a unitary part of the output hub.

12. The drive assembly of claim 1, wherein the second stage ring gear is a separate component from the output hub fixedly mounted to a ring gear mount at an inner annular surface of the output hub.

13. A drive assembly receiving rotational power from an input shaft rotatable about a rotation axis, the drive assembly comprising:
- a drive housing defining a first annular cavity and a second annular cavity as a unitary part of the drive housing;
- a first stage planetary gear set contained in the drive housing, the first stage planetary gear set including a first stage sun gear configured to couple to the input shaft to turn a plurality of first stage planet gears rotatably mounted to a first stage planet carrier that turns with respect to a first stage ring gear fixed with respect to the drive housing at the first annular cavity;
- a second stage planetary gear set contained in the drive housing, the second stage planetary gear set including a second stage sun gear turned by the first stage planet carrier to turn a plurality of second stage planet gears rotatably mounted to the second stage planet carrier fixed with respect to the drive housing at the second annular cavity about which turns a second stage ring gear; and
- an output hub rotated about the rotation axis with respect to the drive housing by rotation of the second stage ring gear on the second stage planet carrier.

14. The drive assembly of claim 13, wherein the first stage ring gear is formed as a unitary part of the first annular cavity of the drive housing concentric about the rotation axis; and
wherein the second stage ring gear is formed as a unitary part of the output hub.

15. The drive assembly of claim 13, wherein the first stage ring gear is a separate component from the drive housing fixedly mounted to the first annular cavity of the drive housing; and
wherein the second stage ring gear is a separate component from the output hub fixedly mounted to a ring gear mount at an inner annular surface of the output hub.

16. The drive assembly of claim 15, wherein the first annular cavity of the drive housing and the first stage ring gear have complementary recesses defining at least one pocket for receiving at least one rotation fixing pin.

17. The drive assembly of claim 13, wherein the second stage planet carrier is formed as a unitary part of the second annular cavity of the drive housing concentric about the rotation axis.

18. The drive assembly of claim 17, further including a brake assembly configured to couple to the input shaft; and
wherein the drive housing defines a brake cavity concentric about the rotation axis and opening at a rear side of the drive housing opposite the second stage planet carrier.

19. The drive assembly of claim 13, wherein the drive housing has an annular outer surface that provides a bearing mount for a bearing mounting the output hub for rotation with respect to the drive assembly;
wherein the bearing mount provides a plane of rotation about which the bearing is mounted symmetrically; and
wherein the output hub includes a sprocket flange for mounting an output sprocket, the output sprocket being centered on the plane of rotation.

20. The drive assembly of claim 13, further including:
- a motor mount coupled to the drive housing; and
- a drive motor mounted to the drive housing by the motor mount to drive the input shaft to rotate about the rotation axis.

* * * * *